United States Patent Office 3,483,424
Patented Dec. 9, 1969

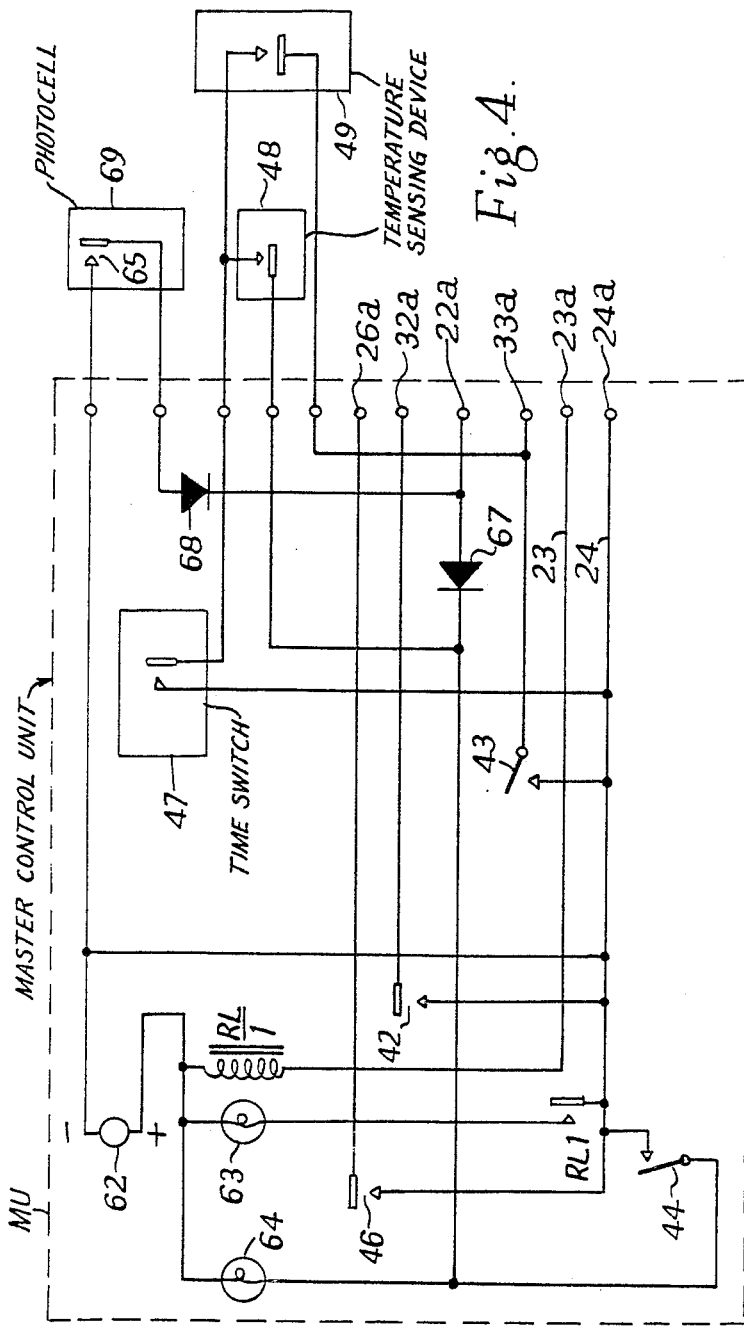

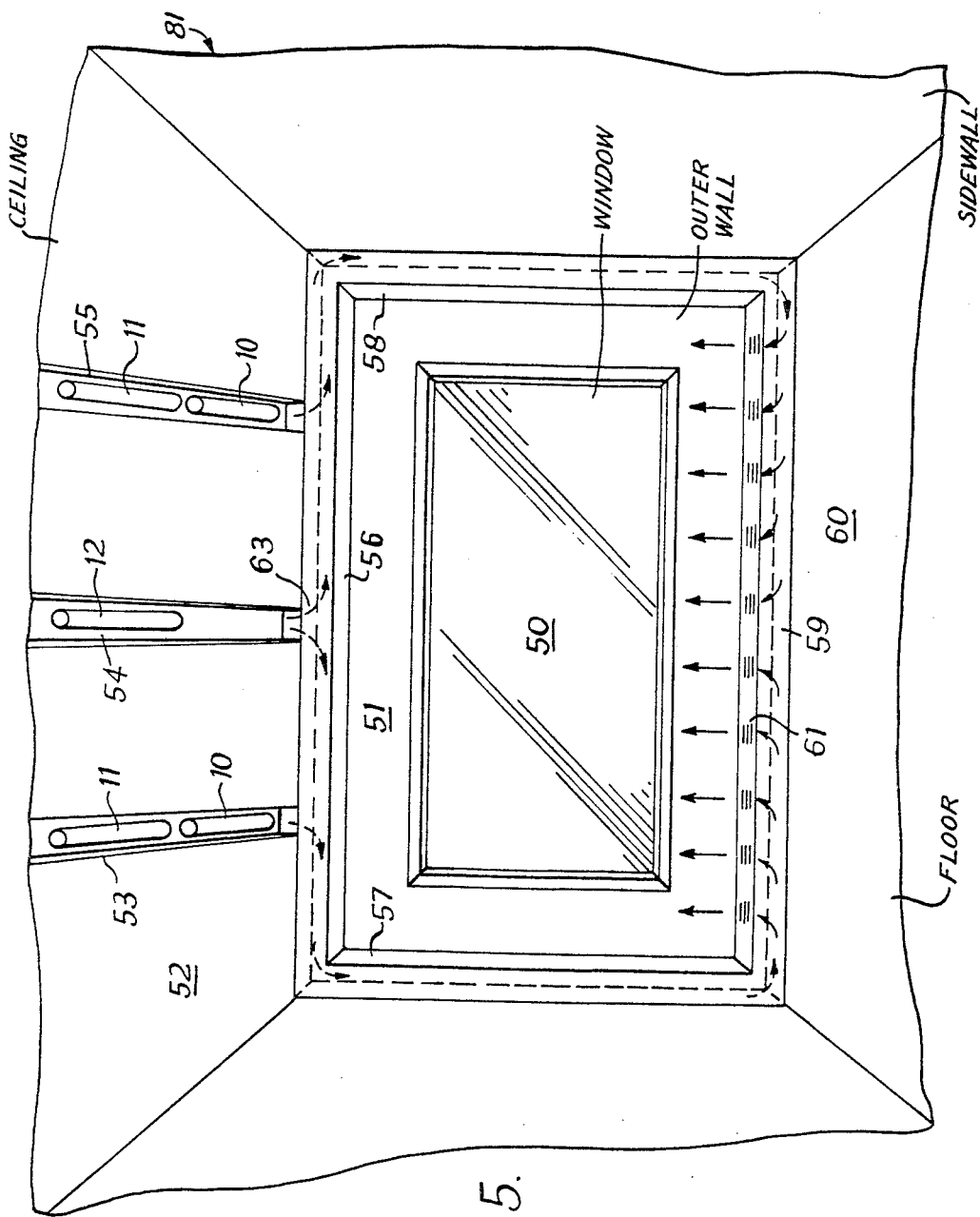

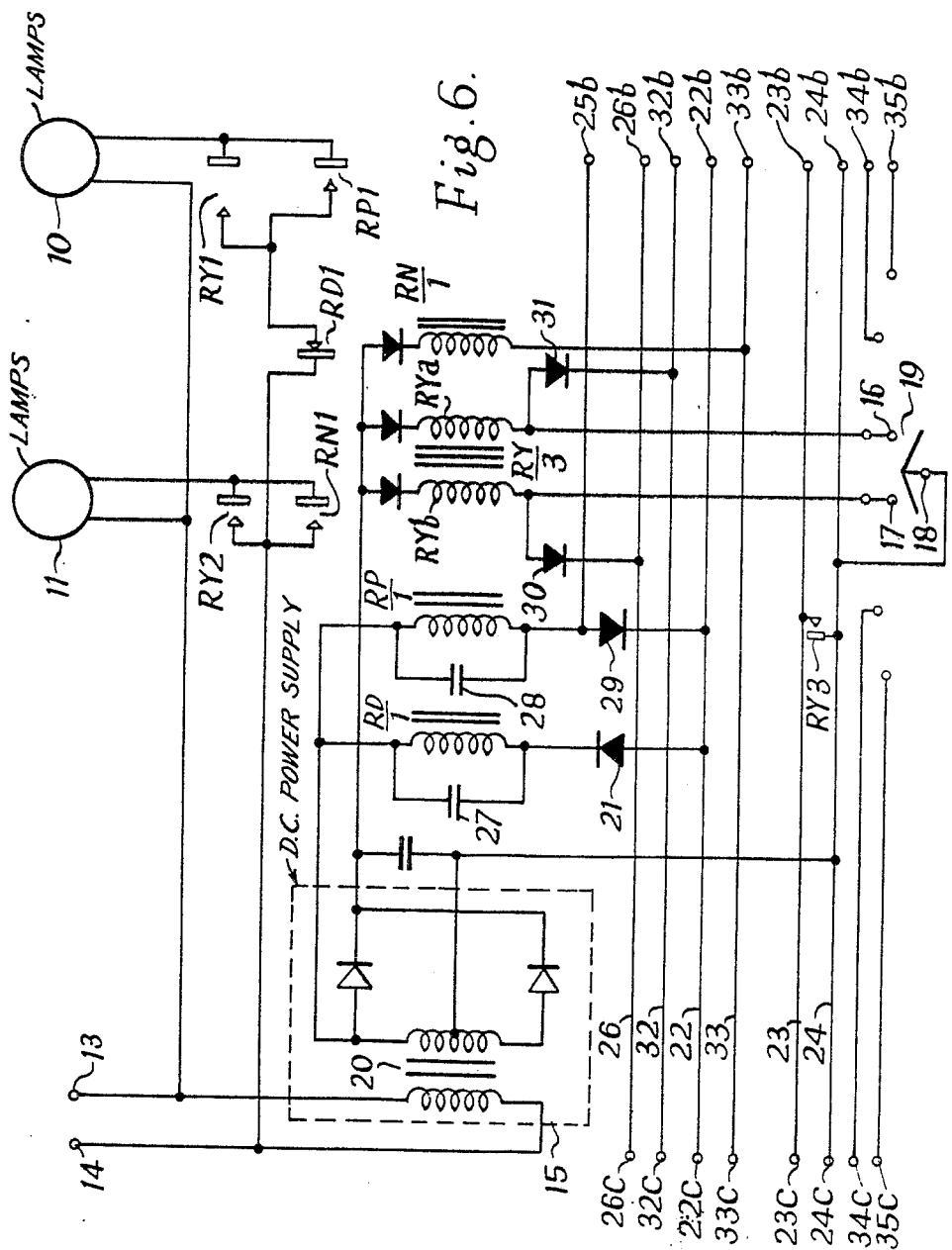

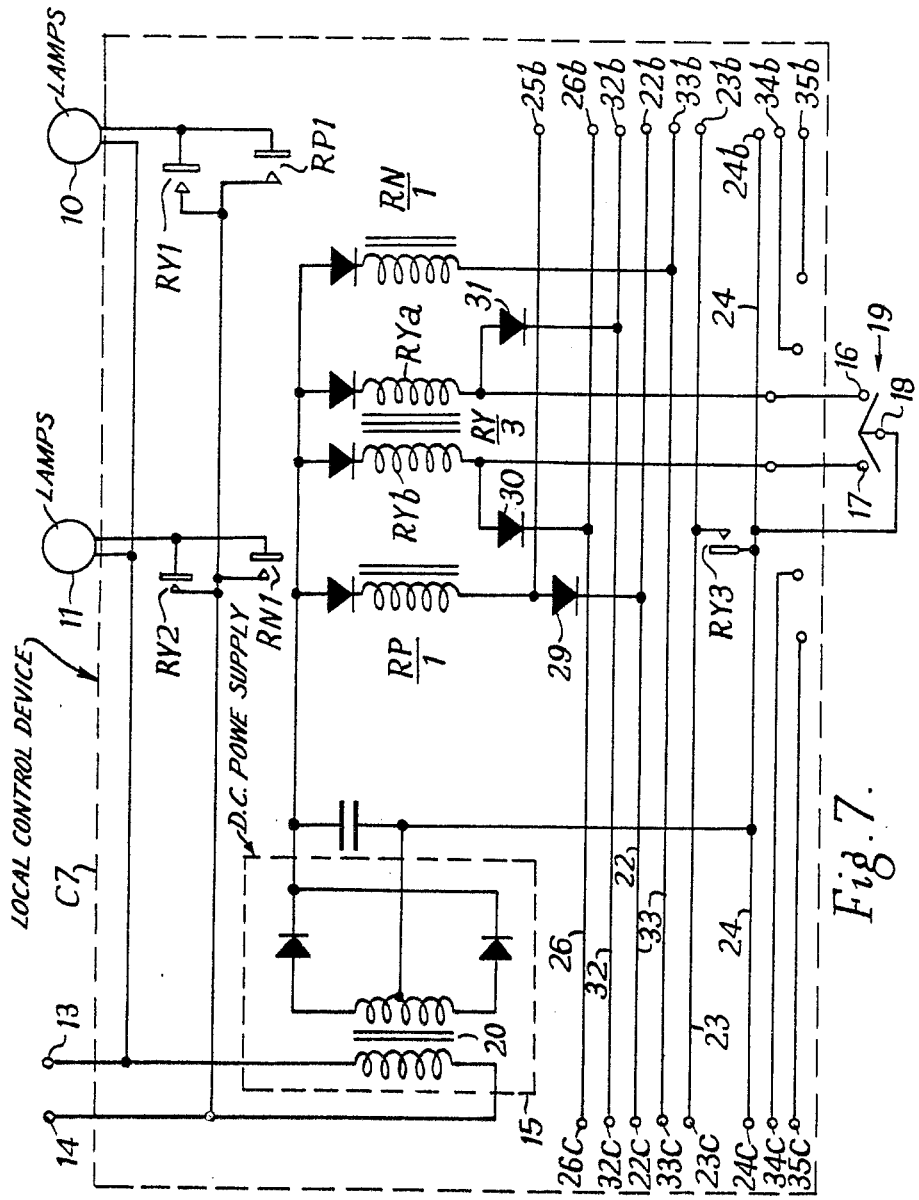

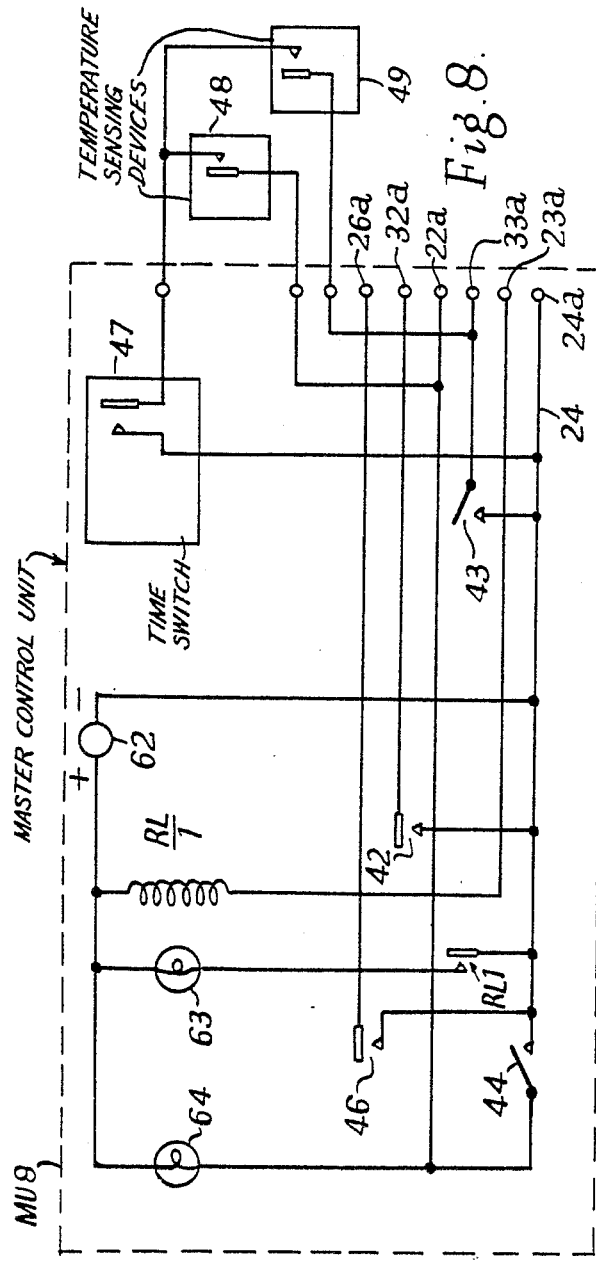

3,483,424
ELECTRIC LIGHTING INSTALLATION
FOR A BUILDING
John Woodnutt, London, England, assignor to Delmatic
Limited, London, England, a company of Great
Britain
Continuation-in-part of application Ser. No. 452,988,
May 4, 1965. This application Aug. 9, 1966, Ser.
No. 571,201
Claims priority, application Great Britain, May 6, 1964,
18,904/64; July 21, 1966, 32,782/66
Int. Cl. H01j 7/24, 13/32, 17/28
U.S. Cl. 315—117                                    16 Claims

ABSTRACT OF THE DISCLOSURE

An electric lighting installation for a building having a plurality of rooms, for example, a multi-storey building. The building lighting installation includes a plurality of groups of lighting loads, each group being in a respective room. Each group is remotely controllable by a master control unit and is also controllable by sensing devices, such as photocells or thermostats, responsive to predeterminated conditions. Each group is also controllable locally at the room by means of a local control device, which is also responsive to the master control unit and the sensing devices.

---

Figure 1:
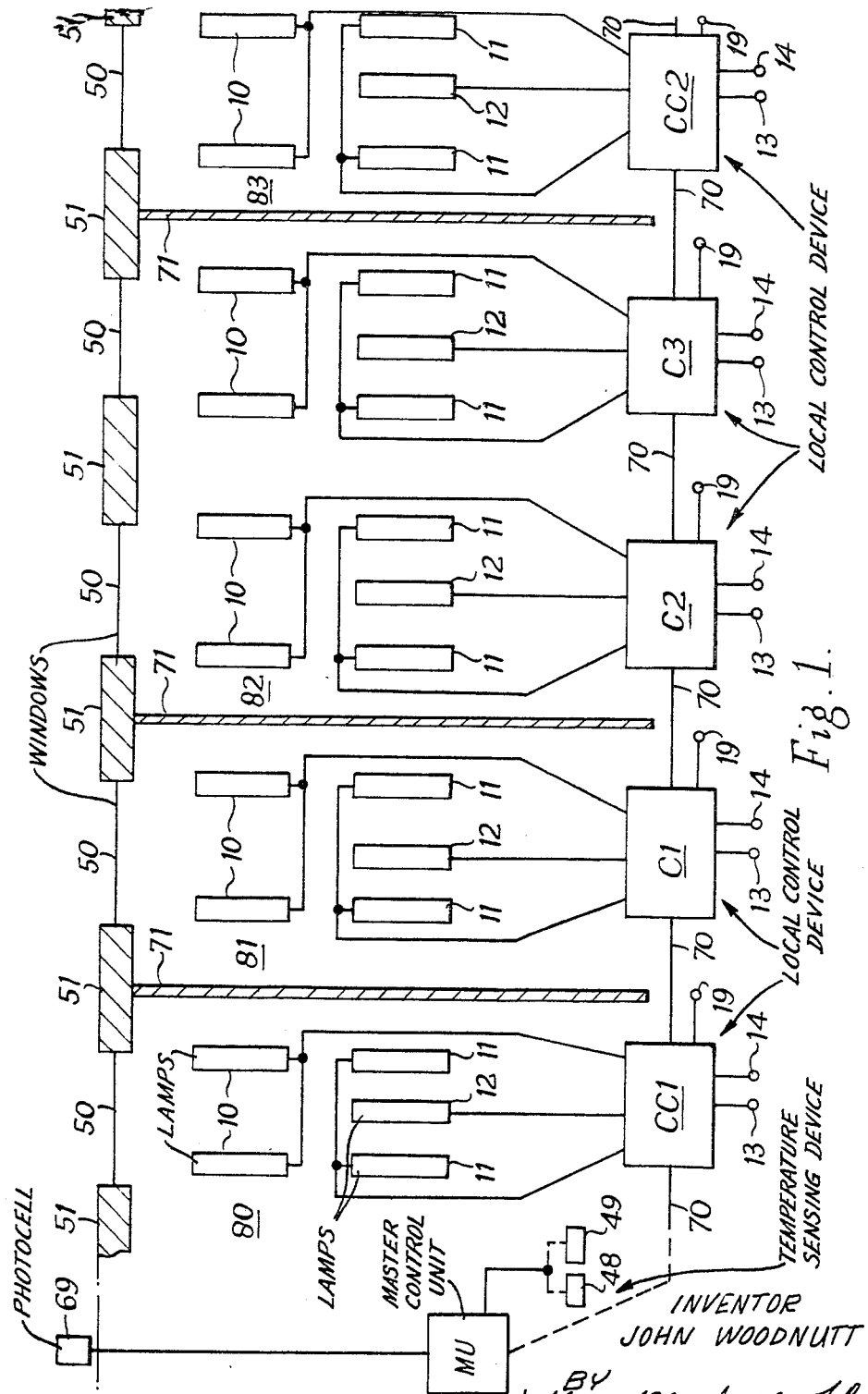

This application is a continuation-in-part of my copending patent application Ser. No. 452,988, filed May 4, 1965, now abandoned.

This invention relates to electrical installations.

Heat generated by electric lamps installed in a multi-storeyed building can provide a substantial contribution to the maintenance of a suitable temperature within the building. It is therefore an object of the present invention to provide an improved lighting electrical installation which includes a control device for controlling the supply of electricity to lighting loads.

Another object of the present invention is to provide an electrical installation having means for remotely controlling the supply of electricity to lighting loads in a multi-storeyed building.

A further object of the present invention is to provide an improved installation embodying means for controlling the supply of electricity to electric lamps in a multi-storeyed building automatically in response to changes in light and temperature conditions.

Yet another object of the present invention is to provide an electrical lighting and controlling installation particularly adapted to use in a multi-storeyed building and capable of providing alternative arrangements in the controlling of the supply of electricity to lighting loads in the building.

According to the present invention an electrical lighting installation includes a control device for controlling the supply of electricity to first and second electrical lighting loads, the control device comprising two first sets of contacts, each set being connected in series with a respective one of the lighting loads and controlled by a first relay, a second set of contacts connected in parallel with one of the first sets and controlled by a second relay, and supply input means which, in operation, can be coupled to the two loads by actuation of the first relay and can be coupled to the said one of the two loads by actuation of the second relay.

In a preferred embodiment of the invention a third relay controlling a third set of contacts is included in the control device, the third set of contacts being connected in parallel with the other of the said first sets of contacts, the supply means being adapted to be coupled to the other of the said two loads by actuation of the third relay.

In another preferred embodiment means are provided for remotely controlling the said first relay in such a manner as to couple the said two lighting loads to the supply input means.

Furthermore, an embodiment of the present invention can be constructed which includes a fourth relay controlling two fourth sets of contacts of which one set is connected in series with the said second set of contacts and the other set is connected in series with the other of the first sets of contacts, the fourth sets of contacts being such that when one set is closed the other is open and vice versa. Preferably means for remotely controlling the fourth relay are provided which include photo-sensitive switching means connected in series with the said fourth relay.

Also, preferably means for remotely controlling the said second relay are provided which include a first set of thermostat contacts connected in series with the second relay and adapted to close at a predetermined temperature, and means for remotely controlling the said third relay are provided which include a second set of thermostat contacts connected in series with the third relay.

Figure 2:
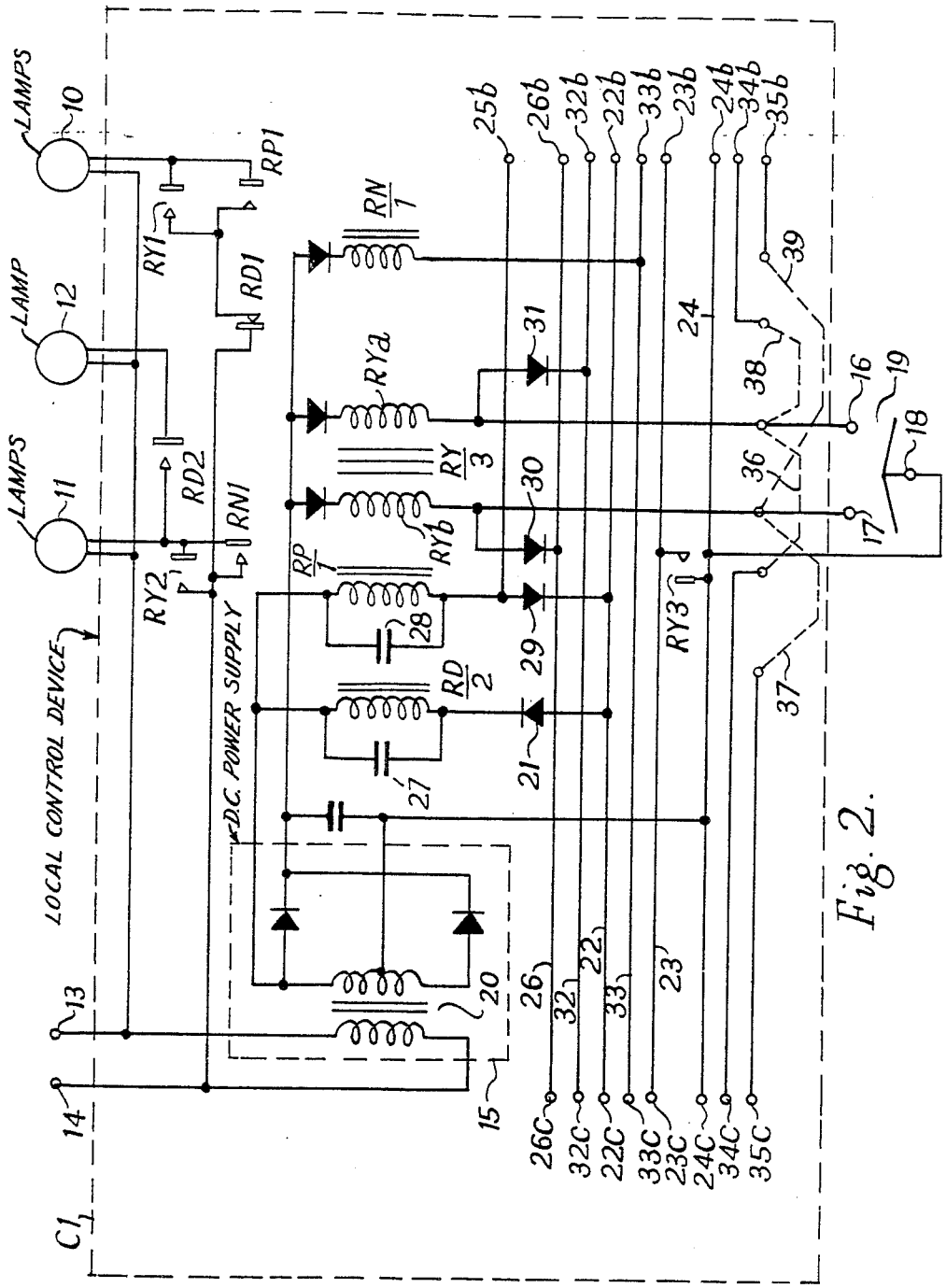
Figure 3:
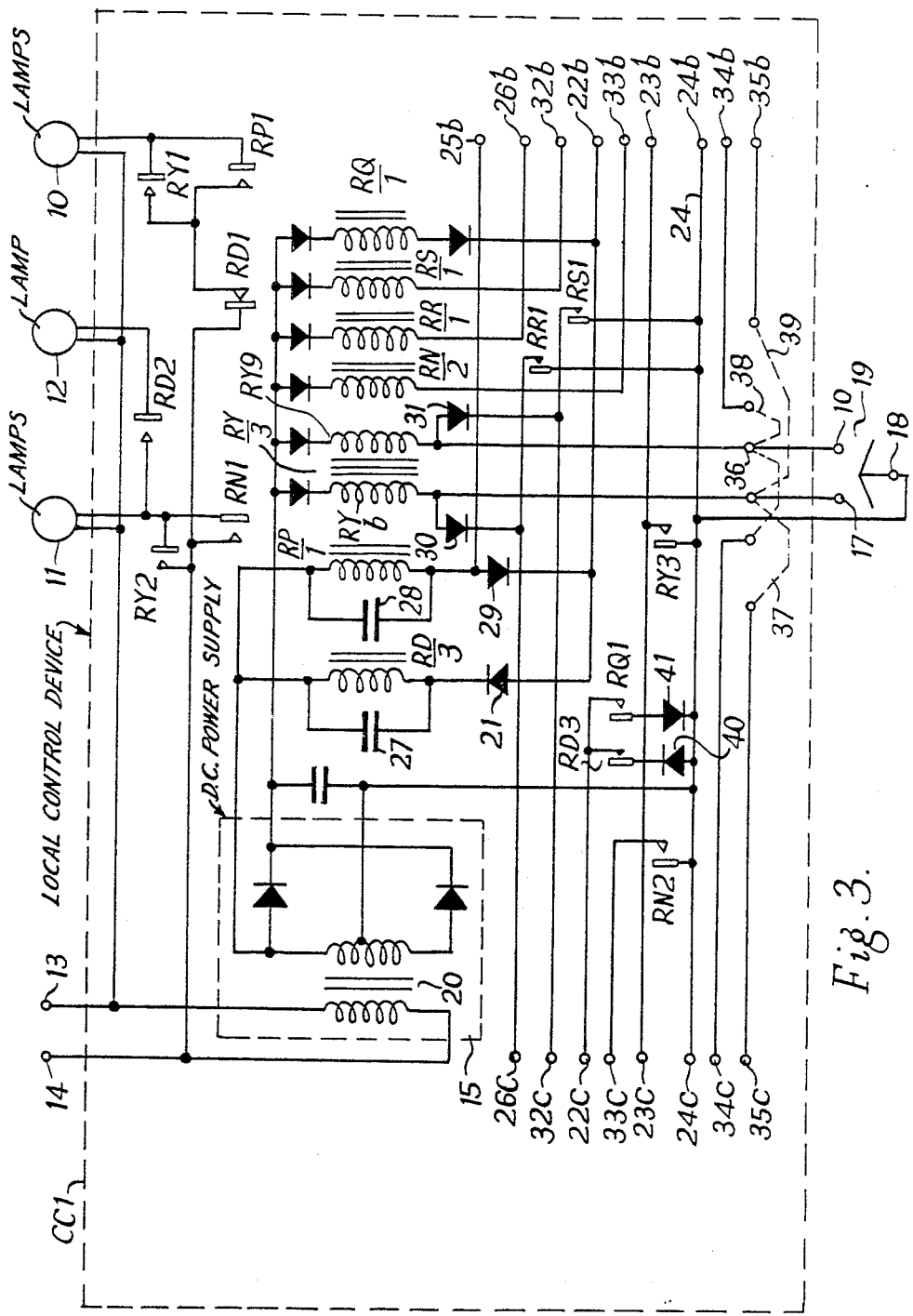

The invention will now be described in more detail by way of example only, with reference to the accompanying drawings in which:

FIGURE 1 is schematic plan view of part of a storey of a multi-storeyed building having an electrical lighting installation according to the present invention, FIGURE 2 is a circuit diagram of different local control device of the present invention, FIGURE 3 is a circuit diagram of a modification of the embodiment installation of FIGURE 1, FIGURE 4 is a circuit diagram including a master unit of part of the electrical lighting installation of FIGURE 1, FIGURE 5 is a simplified perspective view of a room shown in FIGURE 1, FIGURE 6 is a circuit diagram of a modification of the local control device of FIGURE 2, FIGURE 7 is a circuit diagram of a further modification of the local control device of FIGURE 2, and FIGURE 8 is a circuit diagram of a master unit for use in remotely controlling the device of FIGURE 7 in an electrical lighting installation according to the present invention.

Referring to FIGURE 1, there are shown in schematic plan view four rooms 80, 81, 82 and 83 in a storey of a multi-storeyed building. Windows 50 are provided in the outer wall 51 of the building, and each room is separated from immediately adjacent rooms by partitions 71.

Electric lamps 10, 11 and 12 are mounted in groups of five lamps in the rooms 80, 81, 82 and 83, each group of five lamps being controlled, in operation, by a respective one of five local control devices CC1, C1, C2, C3, and CC2 and including two lamps 10 comprising a first electrical lighting load, two lamps 11 comprising a second electrical lighting load, and one lamp 12 comprising a third electrical lighting load.

The lamps 10 are referred to hereinafter as window lamps 10, and the lamps 11 and 12 are referred to hereinafter as inner lamps 11 and 12.

The supply of electricity to each group of five lamps 10, 11, and 12 is provided through a respective pair of input terminals 13 and 14 of the respective local control device.

Each local device includes a respective manually operable switch 19 mounted in the room containing the control device, and is coupled to a master unit MU through a plurality of conductors represented by a line 70. The master unit MU is located in a master-control room in another storey of the building.

Two temperature-sensing devices 48 and 49 and a photocell 69 are coupled to the master unit MU, the photocell 69 being arranged to be responsive to light falling on the building and the temperature-sensing devices 48 and 49 being arranged to be responsive to the temperature in the storey which includes the five rooms shown in FIGURE 1.

During daytime when the light falling on the building is sufficiently strong, the window lamps 10 in the four rooms 80, 81, 82 and 83 are uncoupled from and connections preset for coupling the inner lamps 12 to the respective supply input terminals 13 and 14 by the local control devices, which are actuated from the master unit MU in response to the photocell 69, and in each room the switches 19 can be used to switch the inner lights 11 and 12 of the room "on" or "off" as required by occupants of the rooms. Also, all the inner lamps 11 and 12 can be switched "on" or "off" manually at the master unit MU.

At other times of the day and at night-time, the local control devices uncouple the inner lamps 12 in the four rooms from and preset connections for coupling the window lamps 10 to the respective supply input terminals 13 and 14. The two inner lamps 11 and the window lamps 10 in each group of given lamps can be switched "on" or "off" as required by means of a switch 19, and all the pairs of inner lamps 11 or all the window lamps 10 or both can be switched "on" or "off" manually at the master unit MU, unless the temperature within the storey has fallen below a predetermined level and the local control devices are so actuated from the master unit MU in response to both or one of the temperature-sensing devices 48 and 49 as to couple all the window lamps 10 and/or all the pairs of inner lamps 11 to the respective supply input terminals 13 and 14. The times during which the temperature-sensing devices 48 and 49 are effective are determined by means of an adjustable time switch in the master unit MU.

For adaption to cold weather it can be arranged that all the pairs of inner lamps 11 and/or all the window lamps 10 are coupled to the supply input terminals during times when the building is not generally occupied and the temperature within the storey is below a predetermined level. This facility is provided by the adjustable time switch in the master unit MU as will be described in more detail hereinafter with reference to FIGURE 4. Alternatively, lamps can be switched "on" by means of a manually operable switch at the master unit MU, while allowing occupants of rooms in the building to retain control over the lamps in their room by means of the respective switch 19.

Other electric lamps installed on the same storey as those shown in FIGURE 1 are similarly controlled by further local control devices which are coupled to the master unit MU.

Referring to FIGURE 2, there is shown the circuit diagram of the local control device C1 which controls the lamps 10, 11 and 12 of the room 81 of FIGURE 1. The window lamps 10, the pair of inner lamps 11 and the inner lamp 12 are shown in FIGURE 2 schematically as the first electrical lighting load 10, the second electrical lighting load 11 and the third electrical lighting load 12.

The local control device C1 includes a first relay RY/3 which controls two first sets of contacts RY1 and RY2 of which one set RY1 is connected in series with the first load 10 and the other set RY2 is connected in series with the second load 11, and a set of indicator contacts RY3 for connecting a pair of conductors 23 and 24 extending between terminals 23b and 23c, and terminals 24b and 24c respectively.

A second relay RP/1 controls a second set of contacts RP1 which are connected in parallel with the contacts RY1.

The switch 19, which is a single-pole, double throw, momentary-contact, normally-open push-button switch, comprises manually operable switching means for actuating the first relay RY/3 which is provided with two windings RYa and RYb as shown, one end of each of the windings being connected through a respective isolating diode to a positive voltage output of a direct current power supply shown within the broken line 15. The other ends of the relay windings RYa and RYb are connected to terminals 16 and 17 respectively of the switch 19. The common terminal 18 of the switch 19 is connected to the conductor 24 which is connected to the common side of the power supply 15 and will be referred to hereinafter as the common conductor 24.

The first relay RY/3 is such that it can be switched "on" by a momentary energisation of the winding RYa by operation of the switch 19 to connect the winding RYa to the common terminal 18 and swtched "off" by a momentary energisation of the winding RYb by operation of the switch 19 to connect the winding RYb to the common terminal 18. When the first relay RY/3 is switched "off" its associated contacts RY1, RY2, and RY3 are in the conditions shown in FIGURE 2.

The direct current power supply 15 includes a transformer 20 of which the primary winding is connected to the supply input terminals 13 and 14 to which alternating mains supply voltage is applied in operation. The direct current power supply 15 provides a voltage output, of approximately twenty-four volts, for actuating relays embodied in the local control device C1.

The second relay RP/1 can be energised by effecting a connection between a conductor 22 extending between terminals 22b and 22c, and the common conductor 24. Such a connection can be effected through the operation of the first temperature-sensing device 48 or a manual operation at the master unit MU as will be described hereinafter with reference to FIGURES 3 and 4. Energisation of the second relay RP/1 causes the closure of the second set of contacts RP1.

A third relay RN/1 controls a third set of contacts RN1 which are connected in parallel with the contacts RY2. A connection between a conductor 33 extending between terminals 33b and 33c and the common conductor 24 can be effected through the operation of the second temperature-sensing device 49 or a manual operation at the master unit MU as will be described hereinafter with reference to FIGURES 3 and 4. Such a connection enables the direct power supply 15 to energise the third relay RN/1 which then closes the contacts RN1, thereby coupling the second load 11 to the supply input terminals 13 and 14.

A fourth relay RD/2 controls two fourth sets of contacts RD1 and RD2, of which one set RD1 is connected in series with the second set of contacts RP1 and the other set RD2 is connected in series with the contacts RY2 and the third load 12. The fourth relay RD/2 can be energised by effecting a connection between the conductor 22 extending between the terminals 22b and 22c and the common conductor 24. The making and breaking of such a connection is controlled by the photocell 69 as will be described hereinafter with reference to FIGURES 3 and 4. When the relay RD/2 is energised the contacts RD1 open and the contacts RD2 close. The condition of the two sets of fourth contacts RD1 and RD2 shown in FIGURE 2 exists when the fourth relay RD/2 is not energised.

The second relay RP/1 has its winding connected between one end of the secondary winding of the transformer 20 and a terminal 25b. The junction of the winding of the relay RP/1 and the terminal 25b is also connected through an isolating diode 29, poled as shown, to the conductor 22. In operation, the second relay RP/1 can be energised by positive half cycles of the alternating current provided by the secondary winding of the transformer 20, a capacitor 28 serving to hold the relay "on" during the negative half cycles.

One end of the winding of fourth relay RD/2 is connected to the said one end of the secondary winding of the transformer 20 and the other end of the winding of the relay is connected through an isolating diode 21, poled as shown, to the conductor 22. In operation, the fourth relay RD/2 can be energised by the negative half cycles of the alternating current provided by the secondary winding of the transformer 20, a capacitor 27 serving to hold the relay "on" during the positive half cycles.

One end of the winding of the third relay RN/1 is connected through an isolating diode to the positive voltage output of the direct current power supply 15, and the other end of the winding is connected to the conductor 33.

For the purpose of remotely controlling the first relay RY/3, the end of the winding RYb connected to the terminal 17 is connected through an isolating diode 30 to a conductor 26 extending between terminals 26b and 26c, and the end of the winding RYa connected to the terminal 16 is connected through an isolating diode 31 to a conductor 32 extending between terminals 32b and 32c. A connection between the conductor 26 and the common conductor 24, and a connection between the conductor 32 and the common conductor 24 can be effected by a manual operation at the master unit MU as will be described hereinafter with reference to FIGURES 3 and 4.

Referring again to FIGURE 1, the local control devices C2 and C3 are constructed in substantially the same manner as the local control device C1. Each of the local control devices C1, C2 and C3 includes a plurality of conductors 26, 32, 22, 33, 23 and 24 as shown in FIGURE 2 in the case of the control device C1, and connections between the corresponding conductors in the local control devices are effected by conductors extending between the terminal 26c of the control device C1 and the terminal 26b of the control device C2, and betweenn the terminal 26c of the control device C2 and the terminal 26b of the control device C3, and in like manner in relation to the respective conductors 32, 22, 33, 23 and 24, as indicated by the lines 70. Thus the local control devices are connected in series.

Although the two groups of five lamps in the room 82 are controlled by the two local control devices C2 and C3 respectively, it can be arranged that the respective first relays of the two local control devices C2 and C3 are both actuable by both of the switches 19 in the room 82. Referring to FIGURE 2, it will be seen that the contacts 16 and 17 of the switch 19 can be connected to terminals 34b, 35b, 34c and 35c. For example, if it is required that the contact 16 be connected to the terminal 34c and the contact 17 be connected to the terminal 35c, connections as indicated by broken lines 36 and 37 are provided, or if it is required that the contact 16 be connected to the terminal 34b and the contact 17 be connected to the terminal 35b, connections as indicated by broken lines 38 and 39 are provided. In order to render the first relays of the control devices actuable by both the switches 19 in the room 82, connections corresponding to those indicated by the broken lines 36 and 37 in FIGURE 2 are included in the control device C2 and connections corresponding to those indicated by the broken lines 38 and 39 are included in the control device C3, the terminals 34c and 35c of the control device C2 being connected to the terminals 34b and 35b respectively of the control device C3.

It will be realised that local controlling by means of the switches 19 can thus be adapted in accordance with the removal or addition of partitions between groups of lamps controlled by respective local control devices.

FIGURE 3 shows the circuit diagram of the local control device CC1 from which it can be seen that the local control device CC1 differs from the local control device C1 in the inclusion of three repeater relays RR/1, RS/1, and RQ/1 and their associated isolating diodes and contacts RR1, RS1, and RQ1, an additional set of contacts RN2 controlled by the third relay RN/2, and an additional set of contacts RD3 controlled by the fourth relay RD/3 and an associated isolating diode 40.

The terminals 26b, 32b, 22b 23b and 24b of the local control device CC1 are connected to the master unit MU by respective conductors indicated in FIGURE 1 by a broken line 70. The terminals 26c, 32c, 22c, 33c, 23c and 24c of the local control device CC1 are connected to the terminals 26b, 32b, 22b, 33b, 23b and 24b respectively of the local control device C1 by six conductors indicated in FIGURE 1 by a line 70.

The local control device CC2 is constructed in the same manner as the local control device CC1.

Referring to FIGURE 4, there is shown the circuit diagram of the master unit MU, the photocell 69 and the two temperature-sensing devices 48 and 49.

Terminals 26a, 32a 22a, 33a, 23a and 24a of the master unit MU are connected to the terminals 26b, 32b, 22b, 33b, 23b and 24b respectively of the local control device CC1.

A low voltage direct current power supply 62 having a voltage output of approximately twenty-four volts has its negative output side connected directly to the common conductor 24, and serves to energise, in operation indicator lamps 63 and 64, and a relay RL/1 when appropriate connections are effected.

The relay RL/1 is energised by the low voltage direct current supply 62 when a set of contacts such as the contacts RY3 of the local control device C1 or CC1 close, thereby providing a connection between the conductor 23 and the common conductor 24. Energisation of the relay RL/1 causes its associated contatcs RL1 to close, whereby the indicator lamp 63 is coupled to the supply 62. Thus the indicator lamp 63 is switched on when the first relay of any local control device connected to the master unit MU is energised.

The indicator lamp 64 is energised when a circuit is completed in between the terminal 22a and the terminal 24a through an isolating diode 67 to the common conductor 24 either manually by means of a manually-operable switch 44 or through the first temperature-sensing device 48 and the contacts of an adjustable time switch 47.

The completion of such a circuit between the terminals 22a and 24a through the diode 67 causes the second relay RP/1 and a relay RQ/1 of the local control device CC1 to be coupled to the associated low voltage supply 15, as can be seen with reference to FIGURE 3, whereby the contacts RP1 and RQ1 are closed. The closure of the contacts RQ1 in turn couples the second relay RP/1 of the local control device C1 to its low voltage supply 15, and the second relays of the local control devices C2, C3, and CC2, and a relay RQ/1 in the local control device CC2 to their low voltage supplies.

Each of the temperature-sensing devices 48 and 49 is of the type having a set of contacts which are open when the temperature sensed is above a predetermined level and includes adjusting means for varying the temperature at which the contacts close.

The photocell 69 is mounted in such a position as to be sensitive to changes in light falling on the building and is of the type having a set of contacts 65 which are closed when the light falling is above a predetermined level. Thus, in operation during that period of the day when the light falling is sufficient to maintain the contacts 65 of the photocell 69 closed, a circuit is completed between the terminals 22a and 24a through the set of contacts 65 of the photocell 69 and an isolating diode 68. The completion of such a circuit causes the fourth relay RD/3 of the local control device CC1 to be energised by its low voltage supply 15 as can be seen with reference to FIGURE 3, and causes the fourth relays of the local control devices C1, C2, C3 and CC2 to be energised by virtue of the closure of the contacts RD3 in the local control device CC1.

A circuit can be completed between the terminals 33a and 24a by closure of a manually-operable switch 43 or of the contacts of the second temperature-sensing device 49 and the contacts of the adjustable time switch 47. When such a circuit is completed, the third relay RN/2 of the local control device CC1 is coupled to its low voltage supply 15, thereby causing the load 11 of the device CC1 to be coupled to the respective supply input terminals 13 and 14 through the contacts RN1 and closing the contacts RN2. Closure of the contacts RN2 of the device CC1 couples the third relays of the local control devices C1, C2, C3, and CC2 to their respective low voltage supplies 15.

Thus, in operation, all the inner lamps 11 controlled by the local control devices coupled to the master unit MU can be switched "on" manually at the master unit MU by means of the switch 43, or through the operation of the second temperature-sensing device 49 and the adjustable time switch 47.

It will be realised that, during that period of the day when the light falling on the building is sufficiently strong to enable the photocell 69 to maintain its contacts 65 closed, the contacts RD1 will be open and the contacts DR2 will be closed in the local control devices. Thus, in such circumstances, only the inner lamps 11 and 12 in the storey can be switched "on" by means of the switches 19.

A manually-operable, normally-open, spring-loaded switch 42 is provided in the master unit MU, a momentary closure of which causes the relay RS/1 in the local control device CC1 to be momentarily energised, thereby momentarily closing its associated set of contacts RS1. Thus the winding RYa of the first relay RY/3 of the local control device CC1 is momentarily energised whereby the sets of contacts RY1, RY2 and RY3 are closed. At the same time, the momentary closure of the contacts RS1 cause the contacts controlled by the respective first relays of all the other local control devices to be closed. Thus all the inner lamps 11 and either the inner lamps 12 or the window lamps 10 on the storey can be switched "on" remotely, but occupants of a room where darkness is required can switch the lamps of their room "off" by means of the respective switch 19.

A further manually-operable, normally-open, spring-loaded switch 46 is provided in the master unit MU for enabling the sets of contacts controlled by the first relays of the local control devices coupled to the master unit MU to be opened by means of a momentary energisation of the relay RR/1 of the local control device CC1. The switch 46 thus provides means whereby lamps switched "on" by the operation of a switch 19 and left "on" inadvertently thereafter can be switched "off" remotely at the master unit MU. Also the switch 46 can be used to switch "off" the lamps where these are controlled for heating purposes during out-of-office hours by means of the first relays.

For effect lighting of the building at night the window lamps 10 can be switched "on" by closure of the switch 44, the contacts 65 of the photocell 69 being open at night. For example, referring to FIGURE 3, since the fourth relay RD/3 is not energised at night, the sets of contacts RD1 and RD2 are in the conditions shown, that is the contacts RD1 close and the contacts RD2 open, and the energisation of the second relay RP/1 causes the contacts RP1 to close, so that the first load 10 is coupled to the supply input terminals 13 and 14. Also if the contacts of the adjustable time switch 47 are closed, closure of the contacts of the first temperature-sensing device 48 in response to a fall in the temperature sensed thereby below a predetermined level has the same effect as closure of the switch 44.

The adjustable time switch 47 can be electrically driven or powered by a wound spring, and includes adjusting means whereby the period of the day during which its contacts are open can be altered in length and the time of its starting. The time switch 47 is preset to maintain its contacts open during office hours and to maintain its contacts closed out of office hours. Thus out of office hours the inner lamps 11 and either the window lamps 10 or the inner lamps 12 can be switched on when the temperature in the storey falls below predetermined levels by means of the operation of the temperature-sensing devices 48 and 49. The respective temperatures at which the contacts of the temperature-sensing devices 48 and 49 close can be one and the same temperature.

When the light falling on the building is not sufficiently strong to enable the photocell to maintain its contacts 65 closed, the fourth relays of the local control devices, such as the relay RD/3 of the device CC1, are uncoupled from their respective low voltage supplies 15 and their associated contacts revert to the states shown in FIGURES 2 and 3. The third loads 12, cannot then be coupled to the respective supply input terminals, but the first loads 10, that is the window lamps 10, can be coupled to the respective input terminals by closure of the sets of contacts controlled by the first relays or by the second relays.

If the contacts 65 of the photocell 69, and the contacts of the temperature-sensing devices 48 and 49 are open, the switch 43 of the master unit MU can be used to switch on the inner lamps 11, and the switch 44 can be used to switch on the window lamps 10, or the switches 42 and 46 can be used to switch on and off respectively the inner lamps 11 and the window lamps 10. If also, the switch 43 is open, and the switch 44 is effectively open, for example as shown in FIGURE 4, the switches 19 of the local control devices can be used to switch the respective window lamps 10 and inner lamps 11 coupled thereto.

Referring to FIGURE 1, the local control device CC2 is coupled to further local control devices, not shown, through a plurality of conductors connected to is terminals 26c, 32c, 22c, 33c, 23c, and 24c and represented by line 70. It will be realised that in this way the master unit MU can be coupled to all the local control devices installed in the storey, and the local control devices being connected in series and including a plurality of devices such as the device CC1 and a larger plurality of devices such as the device C1. The largest number of devices such as the device C1 which can in practice be connected in series between a pair of devices such as the devices CC1 and CC2 depends on the power rating of the low voltage supplies 15 the electrical resistance per unit length of the conductors reprsented by the lines 70 and the corresponding conductors in the local control devices, and the power rating of the relays in the local control devices.

Referring to FIGURES 2 and 3 it can be seen that the local control devices are each provided with means for coupling their respective second relays, for example, the relay RP/1 in FIGURE 2, to further control means in the form of the terminal 25b. A circuit can be completed between each terminal 25b and the common conductor 24 through a switching arrangement (not shown) intended for use in presenting a pattern of illuminated windows in a wall of the building during night-time when the switches and contacts of the master unit MU, the photocell 69, and the temperature-sensing devices 48 and 49 are in the conditions shown in FIGURE 4.

FIGURE 5 shows a simplified perspective view of the room 81 of FIGURE 1. The window 50 is in the outer wall 51 of the storey containing the room 81. The electric lamps 10, 11 and 12 installed in the room are mounted in air ducts 53, 54 and 55 formed in the ceiling 52 of the room. The air ducts 53, 54 and 55 have translucent lower walls (not shown) to allow light from the electric lamps to pass into the room, and open at their ends adjacent the outer wall 51 into an upper horizontal air duct 56 mounted at the junction of the outer wall 51 and the ceiling 52. Two vertical air ducts 57 and 58 connect the ends of the upper horizontal air duct 56 with the ends of a lower horizontal air duct 59 mounted at the junction of the outer wall 51 and the floor 60 of the room.

The upper surface 61 of the air duct 59 is apertured by a plurality of groups of slots distributed along the length of the air duct 59, which are indicated schematically in FIGURE 5 by groups of three lines such as the group 62.

The ends of the air ducts 53, 54 and 55 remote from the outer wall 51 are so coupled to a ventilating system installed in the building that, in operation, air is caused to flow through the air ducts 53, 54 and 55 towards the upper horizontal air duct 56 and thence through the vertical air ducts 57 and 58 to the lower horizontal air duct 59 from which it escapes through the plurality of groups of slots in the upper surface 61. Thus a curtain of air adjacent the outer wall 51 and the window 50 can be caused to flow upwards and can be heated by the electric lamps installed in the room. The path of air through the air ducts and from the plurality of groups of slots in the air duct 59 is indicated by arrows and broken lines as at 63 in FIGURE 3.

Each group of five lamps 10, 11 and 12 controlled by a respective local control unit coupled to the master unit MU is installed in air ducts as described with reference to FIGURE 5. However, the use of air ducts is not essential to the present invention and any other suitable means for distributing heat generated by the lamps can be used.

The master unit MU is located together with corresponding master units for the other storeys of the multi-storeyed building in a control room. It is therefore possible for a person in the control room to obtain information from the indicator lamps 63 and 64 of the master unit MU and corresponding lamps of the other master control units regarding the lighting and heating throughout the building.

It will be apparent that the electric lamps controlled by a master unit can be installed in a multi-storeyed building in ways other than on a single storey of the building.

It will also be apparent that each local control device according to the present invention can control more or fewer than six groups of electric lamps and that the electric lamps can be mounted in air ducts in any convenient positions in the respectively room.

Furthermore, a control device according to the present invention can control electric lamps in more than one room and can control electric lamps mounted in air ducts in corridors within a multi-storeyed building.

FIGURE 6 shows a local control device which differs from the local control device C1 in that there is no third load, the fourth relay RD/1 controlling a single fourth set of contacts RD1. Consequently, in operation, the local control device of FIGURE 6 functions in the same manner as the device C1 except for the controlling of a third load, and can be coupled to a master unit such as the master unit MU.

A similar local control device can be constructed which differs from the device CC1 shown in FIGURE 3 by the omission of the set of contacts RD2, there being no third load 12.

FIGURE 7 shows a local control device C7 in which the coupling of first and second loads 10 and 11 to supply input terminals 13 and 14 are controlled by a first relay RY/3, a second relay RP/1, and a third relay RN/1 which correspond to the first, second and third relays of the local control device C1.

FIGURE 8 shows a master unit MU8 intended for use with the local control device C7. The terminals 26a, 32a, 22a, 33a, 23a, and 24a of the master unit MU8 can be connected to the terminals 26b, 32b, 22b, 33b, 23b and 24b respectively of the local control device C7. No photocell is coupled to the master unit MU8 and there is no fourth relay in the local control device C7. The sets of contacts of a first temperature-sensing device 48 and a second temperature-sensing device 49 are connected in series with the contacts of an adjustable time switch 47 in the master unit MU8.

In operation, the loads 10 and 11 can be coupled to and uncoupled from the supply input terminals 13 and 14 by the energisation of a winding RYa and a winding RYb respectively of the first relay RY/3 by a low-voltage direct-current supply 15. Such energisation can be effected locally by means of a manually-operable, single-pole, double-throw, momentary-contact, normally-open, push-button switch 19, or at the master unit MU8 by means of manually-operable, spring-loaded switches 42 and 46 respectively.

An indicator lamp 64 is energised by the supply 62 when a circuit is completed between the terminals 22a and 24a through a manually-operable, switch 44 or through the contacts of the time switch 47 and the first temperature-sensing device 48, thus indicating the energisation of the second relay RP/1 by the supply 15 and the coupling of the first load 10 to the supply input terminals 13 and 14 by the closure of the contacts RP1.

The third relay RN/1 of the device C7 can be coupled to the supply 15 by closure of a manually operable switch 43 or of the contacts of the time switch 47 and the second temperature-sensing device 49 at the master unit MU8. Thus the second load 11 can be coupled to the supply input terminals 13 and 14 by the closure of the contacts RN1.

Another embodiment of the present invention differs from the device C7 in that the third relay RN/1 and its associated contacts RN1 are omitted.

It will be realised that where automatically operated sets of contacts, such as the contacts 65 of the photocell 69 and the contacts of the two temperature-sensing devices, are shown, such sets of contacts can be replaced by manually operable switches.

What is claimed is:
1. In a building having a plurality of rooms, an electrical lighting installation including:
  (I) a plurality of groups of two lighting loads, each group being in a respective one of the rooms;
  (II) a respective control device for controlling the supply of electricity to each respective group of two lighting loads, each control device comprising:
    (a) a first relay,
    (b) two first sets of contacts controlled by the said first relay, each first set being connected in series with a respective one of the lighting loads,
    (c) a second relay,
    (d) a second set of contacts connected in parallel with one of the said first sets of contacts and controlled by the said second relay,
    (e) supply input means which, in operation, can be coupled to the said two loads by actuation of the said first relay and can be coupled to the said one of the said two loads by actuation of the said second relay, and
    (f) first manually operable switching means located in the respective room for actuating the said first relay;
  (III) a master control unit comprising second manually operable switching means for remotely controlling the said first relays in such a manner as to uncouple each respective group of two lighting loads from the respective supply input means; and
  (IV) sensing means adapted to control remotely the said second relays in depedence upon at least one predetermined condition.

2. An electrical lighting installation as claimed in claim 1, wherein each control device includes a respective third relay and a respective third set of contacts connected in parallel with the other of the said first sets of contacts and controlled by the said third relay, the said supply input means being adapted to be coupled to the other of the said two loads by actuation of the said third relay, there being means for remotely controlling each of the said third relays.

3. An electrical lighting installation as claimed in claim 1, wherein the master control unit includes third manually operable switching means for remotely controlling each of the said first relays in such a manner as to couple the said respective two lighting loads to the said supply input means.

4. An electrical lighting installation as claimed in claim 1, wherein each of the said control devices includes a respective further relay, and a respective further set of contacts controlled by the said further relay and connected in series with the said second set of contacts, there being means for remotely controlling the said further relays.

5. An electrical lighting installation as claimed in claim 4, wherein a respective third lighting load is associated with each of the said groups of two lighting loads, each control device including another further set of contacts controlled by the said further relay and connected in series with the other of the said first sets of contacts, the said another set of contacts being closed when the first said further set of contacts is open and vice versa.

6. An electrical lighting installation as claimed in claim 2, wherein the said means for remotely controlling the said second relays includes a first set of normally open thermostat contacts connected in series with the said third relays and adapted to close at a predetermined temperature.

7. An electrical lighting installation as claimed in claim 2, wherein the said means for remotely controlling the said third relays includes a second set of normally open thermostat contacts connected in series with the said third relays.

8. An electrical lighting installation as claimed in claim 4, wherein the said means for remotely controlling the said further relays includes photo-sensitive switching means connected in series with the said further relays.

9. An electrical lighting installation as claimed in claim 1, wherein the master control unit includes means for actuating the said control devices in such a manner as to couple the said groups of two loads to the said supply input means.

10. An electrical lighting installation as claimed in claim 6, wherein the said means for remotely controlling the said second relays includes a set of normally open time-switch contacts connected in series with the said first set of thermostat contacts and adapted to close during a predetermined interval of time.

11. An electrical lighting installation as claimed in claim 7, wherein the said means for remotely controlling the said third relays includes a set of normally open time-switch contacts connected in series with the said second set of thermostat contacts and adapted to close during a predetermined interval of time.

12. An electrical lighting installation as claimed in claim 1, wherein each local control device is connected directly to at least one other of the local control devices by a plurality of electrical conductors, and the second manually operable switching means and the automatic switching means are connected between selected ones of a corresponding plurality of electrical conductors connected to at least one of the local control devices.

13. In a multi-storeyed building having a plurality of rooms with windows, an electrical lighting installation including:
(I) a plurality of groups of three lighting loads, each group being in a respective one of the rooms and so arranged that one of the lighting loads is adjacent the window area of the respective room and the other two lighting loads are disposed to illuminate areas in the respective room away from the said window area,
(II) a respective control device for controlling the supply of electricity to each respective group of three lighting loads, each control device comprising:
(a) a first relay,
(b) two first sets of contacts controlled by the said first relay, one of the said first sets being connected in series with the respective lighting load adjacent the window area of the respective room and another of the said first sets being connected in series with one of the respective lighting loads disposed to illuminate areas away from the window area,
(c) a second relay,
(d) two second sets of contacts, one of the said second sets being connected in series with the said first set connected in series with the respective lighting load adjacent the window area of the room, and the other of the said second sets being connected in series with the other of the respective lighting loads disposed to illuminate areas away from the window area, the said one second set being closed when the said other second set is open and vice versa,
(e) supply input means which, in operation, can be coupled to two of the said three lighting loads by actuation of the said first relay, and
(f) first manually operable switching means located in the respective room for actuating the said first relay;
(III) a master control unit comprising second manually operable switching means for remotely controlling the said first relays in such a manner as to uncouple each respective group of lighting loads from the respective supply input means; and
(IV) ambient light-sensing means adapted to control remotely the said second relays.

14. An electrical lighting installation as claimed in claim 13, wherein each control device includes a respective third relay to control a respective third set of contacts connected in parallel with one of the said first sets, and temperature-sensing means are provided to control remotely the said third relays.

15. An electrical lighting installation as claimed in claim 14, wherein the master control unit includes time-switch means adapted to render said temperature-sensing means operable only during a predetermined interval of time.

16. An electrical lighting installation as claimed in claim 15, wherein each control device includes a respective fourth relay to control a respective fourth set of contacts connected in parallel with the other of the said first sets, the said temperature-sensing means including means to control remotely the said fourth relays.

References Cited

UNITED STATES PATENTS

| | | | |
|---|---|---|---|
| 1,048,978 | 12/1912 | Levison | 315—313 X |
| 1,116,007 | 11/1914 | Burns et al. | 315—313 X |
| 2,190,110 | 2/1940 | Usselman et al. | 250—27.5 |
| 2,027,405 | 1/1936 | Smede | 219—20 |
| 2,325,258 | 7/1943 | Mallory | 175—352 |

JOHN W. HUCKERT, Primary Examiner

SIMON BRODER, Assistant Examiner

U.S. Cl. X.R.

315—118, 312